United States Patent [19]
Beck et al.

[11] Patent Number: 5,366,047
[45] Date of Patent: Nov. 22, 1994

[54] DISC BRAKE WITH RING-SHAPED PRESSING ELEMENT

[75] Inventors: Erich Beck, Winterbach; Manfred Minning, Ebersbach; Emil Näumann, Reichenbach; Joseph Wese, Dorfen, all of Germany

[73] Assignee: Mercedes-Benz AG, Germany

[21] Appl. No.: 987,467

[22] Filed: Dec. 7, 1992

[30] Foreign Application Priority Data

Dec. 6, 1991 [DE] Germany .............. 4140279

[51] Int. Cl.⁵ ............................ F16D 65/38
[52] U.S. Cl. .................. 188/73.37; 188/72.4; 267/170
[58] Field of Search ............ 188/71.1, 71.4, 72.1, 188/72.2, 72.4, 73.35, 73.36, 73.37, 73.38; 192/84, 129; 92/13.1, 52

[56] References Cited

U.S. PATENT DOCUMENTS

| | | | |
|---|---|---|---|
| 2,797,931 | 7/1957 | Hans | 188/380 |
| 3,653,473 | 4/1972 | Clay et al. | 188/353 |
| 3,720,293 | 3/1973 | Hikida et al. | 188/73.32 |
| 3,722,634 | 3/1973 | Ogasawara et al. | 188/73.37 |
| 3,890,884 | 6/1975 | Silberschlag | 188/72.4 |
| 4,055,238 | 10/1977 | Haraikawa et al. | 188/73.45 |
| 4,066,153 | 1/1978 | Plentz | 92/129 |
| 4,235,314 | 11/1980 | Reagan | 188/73.38 |
| 4,496,033 | 1/1985 | Hall et al. | 188/347 |
| 4,570,531 | 2/1986 | Anderson et al. | 92/52 |
| 4,581,985 | 4/1986 | Villata | 188/72.4 |
| 4,815,359 | 3/1989 | Black | 92/52 |
| 4,875,556 | 10/1989 | Shaw et al. | 92/129 |
| 5,090,519 | 2/1992 | Golea et al. | 188/73.37 |
| 5,249,646 | 10/1993 | Thiel | 188/72.6 |

FOREIGN PATENT DOCUMENTS

| | | | |
|---|---|---|---|
| 1962316 | 6/1967 | Germany . | |
| 2022699 | 12/1970 | Germany . | |
| 2022700 | 12/1970 | Germany . | |
| 2047634 | 4/1971 | Germany . | |
| 3317980 | 11/1984 | Germany . | |
| 3540810 | 6/1987 | Germany . | |
| 3916741 | 11/1990 | Germany . | |
| 0021027 | 2/1983 | Japan | 188/73.38 |

Primary Examiner—Andres Kashnikow
Assistant Examiner—Chris Schwartz
Attorney, Agent, or Firm—Evenson, McKeown, Edwards & Lenahan

[57] ABSTRACT

In disc brakes, disturbing noises, such as whistling or squealing, occurring during braking operations can be prevented if the brake shoe, to be pressed against a brake disc by a pressure member, for example a hydraulically actuated piston, is taken along in the circumferential direction of the latter as soon as the brake shoe comes into contact with the brake disc, and is laid against bearing faces of a brake anchor plate. Accordingly, the pressure member is provided, on its end face facing the brake shoe, a pressing element which projects beyond the end face, is transversely movable to a limited extent and returns automatically to its initial position again, and which is arranged in the pressure member so as to be axially displaceable counter to a return force which, in the event of mutual contact between the pressing element and brake shoe, is lower than the pressing force of the pressure member.

6 Claims, 4 Drawing Sheets

DISC BRAKE WITH RING-SHAPED PRESSING ELEMENT

BACKGROUND AND SUMMARY OF THE INVENTION

The present invention relates to a disc brake and, more particularly to a disc brake comprising a pressure member guided adjustably, in the direction of a brake shoe, in a brake caliper, and a pressing element operatively arranged with radial play in the pressure member such that, in an initial position of the pressure member, the pressing element projects from a front end of the pressure member facing the brake shoe, is supported on the brake shoe and can be pressed back into the pressure member counter to the effect of a return force which, in the event of mutual contact between the pressing element and brake shoe, is lower than a pressing force of the pressure member.

It is known that, during braking operations, disc brakes can generate disturbing whistling or squealing noises with a sound-pressure level of up to 80 dB. Investigations have shown that such noises can be prevented or reduced to such an extent that at most they still contrast slightly with the normal operating noises of the vehicle.

This is true inasmuch as, even at very low pressing forces, the brake shoe loaded by a pressure member, for example a brake piston, is brought to bear against its associated bearing faces of the disc-brake anchor plate guiding the brake caliper, thereby varying the vibration behavior of the brake shoe correspondingly.

To achieve this, German Auslegeschrift No. 2,047,634, provides, for example, in a disc-brake brake piston forming the pressure member, a cylindrical pressing element which projects beyond the brake piston and is supported on the brake shoe and which is arranged in the brake piston so as to be freely movable to a limited extent perpendicularly to the piston axis.

Furthermore, German Offenlegungsschrift No. 2,022,699 discloses a disc brake in which there is provided as a pressing element a plate which consists of metal or sintered metal powder and which either is fastened to the side of the brake shoe facing the brake piston and is in engagement with the brake piston or is fastened to the latter and is in engagement with the brake shoe.

By way of this plate, a lubricant is held between the mutually opposite faces of the brake shoe and brake piston, in order to reduce friction between these parts or, should a braking force take effect, to allow a transverse movement of the brake shoe in relation to the axis of the brake piston.

It is known from German Offenlegungsschrift No. 2,022,700 to provide rolling bodies, in the form of balls or rollers, between the brake shoe and the brake piston in order to achieve a transverse movement of the loaded brake shoe.

Another disc brake is described in German Utility Model No. 1,962,316. Here, the pressing element forms a solid thrust piece made of elastically deformable material, via which the pressure member forming a piston initially transmits the braking force to the brake shoe. At the same time, the diameter of the piston orifice receiving the thrust piece is larger than that of the thrust piece and corresponds to the elastic deformability inherent in the thrust piece. It is thereby guaranteed that, at the commencement of a braking operation, the thrust piece is gradually compressed or pressed into the piston until the piston itself finally comes to bear, with its end face, against the brake shoe. This ensures that, in braking operations, there is initially no direct heat transfer from the brake shoe to the piston and consequently the hydraulic device actuating the piston can be protected from overheating. Furthermore, the elastic material has a damping effect when the brake disc or disc lining is distorted.

However, the braking forces to be transmitted initially require a compressive strength of the thrust piece which restricts its elasticity such that, at the commencement of a braking operation or in the event of low pressing forces, the brake shoe loaded by the thrust piece cannot be taken along by the brake disc to such an extent that it finally comes to bear against corresponding bearing faces of the brake anchor plate for the purpose of noise reduction.

An object of the present invention is to provide a disc brake which, while being of a construction characterized by technical simplicity, ensures that the brake shoe is taken along reliably, even at low pressing forces, to bear against the brake anchor plate and, at the conclusion of a braking operation, that the pressing element interacting with the brake shoe is returned into its initial position in the pressure member.

This object has been achieved, according to the present invention, by configuring the pressing element as a ring which is supported on a metal spring inserted into the pressure member.

The support of the pressing element, forming a radially movable ring, on a metal spring inserted into the pressure member affords the advantage that, even at low pressing forces and therefore immediately when the pressure member is loaded, an effective reduction of whistling and squealing noises is obtained. Furthermore, even when there is only slight friction between the brake shoe and brake disc, the brake shoe, together with the annular pressing element, is taken along relative to the pressure member, with a corresponding deformation of the metal spring, in the circumferential direction of the brake disc, until it butts against the brake anchor plate.

The construction and support of the pressing element of the present invention thus form an arrangement which reacts sensitively when brought to bear on the brake shoe and which makes it possible, in the initial position of the brake shoe, to keep the annular pressing element in contact with the latter with a specific pressing force and, moreover, as a result of the merely annular bearing of the supporting element against the brake shoe, to keep the heating of the pressure member low during braking operations.

For example, in addition to the disc brake described in the aforementioned to German Utility Model No. 1,962,316, with which the invention is used, German Offenlegungsschrift No. 3,916,741 describes a disc brake whose piston-shaped pressure member already has a pressing element which is inserted into its front end and which, in a similar way to the construction according to the present invention, is arranged so as to move radially in this member and, after the release of the disc brake, always returns reliably into its mid-position or initial position again, irrespective of the extent of its transverse movement.

The pressing element forms a pressure plate which is displaceable within the pressure member on a sliding plate which is inserted into the latter and which opposes a slight frictional resistance to the pressure plate. The return of the pressure plate is brought about by a complex return device which has a plunger arranged coaxially in the brake piston and which passes with one endpiece through the sliding plate at a radial distance and is held in the pressure plate. The other plunger end has a flange, on which a prestressed compression spring surrounding the plunger and bearing against a threaded ring seated in the brake piston is supported.

In the initial phase of the transmission of a braking force to the brake shoe by the brake piston, the pressure plate within the brake piston is displaced radially when the brake shoe comes into engagement with the brake disc. This leads to a tilting of the plunger, with the compression spring being prestressed further on one side. The latter constantly endeavors to pivot the plunger back into its initial position again. When the brake is released, the spring return force increased by the tilting of the plunger therefore causes a return movement of the pressure plate into its initial position, in which the plunger resumes its coaxial position in relation to the piston axis. This construction, in addition to being of a complex design, necessitates complicated assembly work. The present invention can be used to improve this type of disc brake as well.

BRIEF DESCRIPTION OF THE DRAWINGS

These and further objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
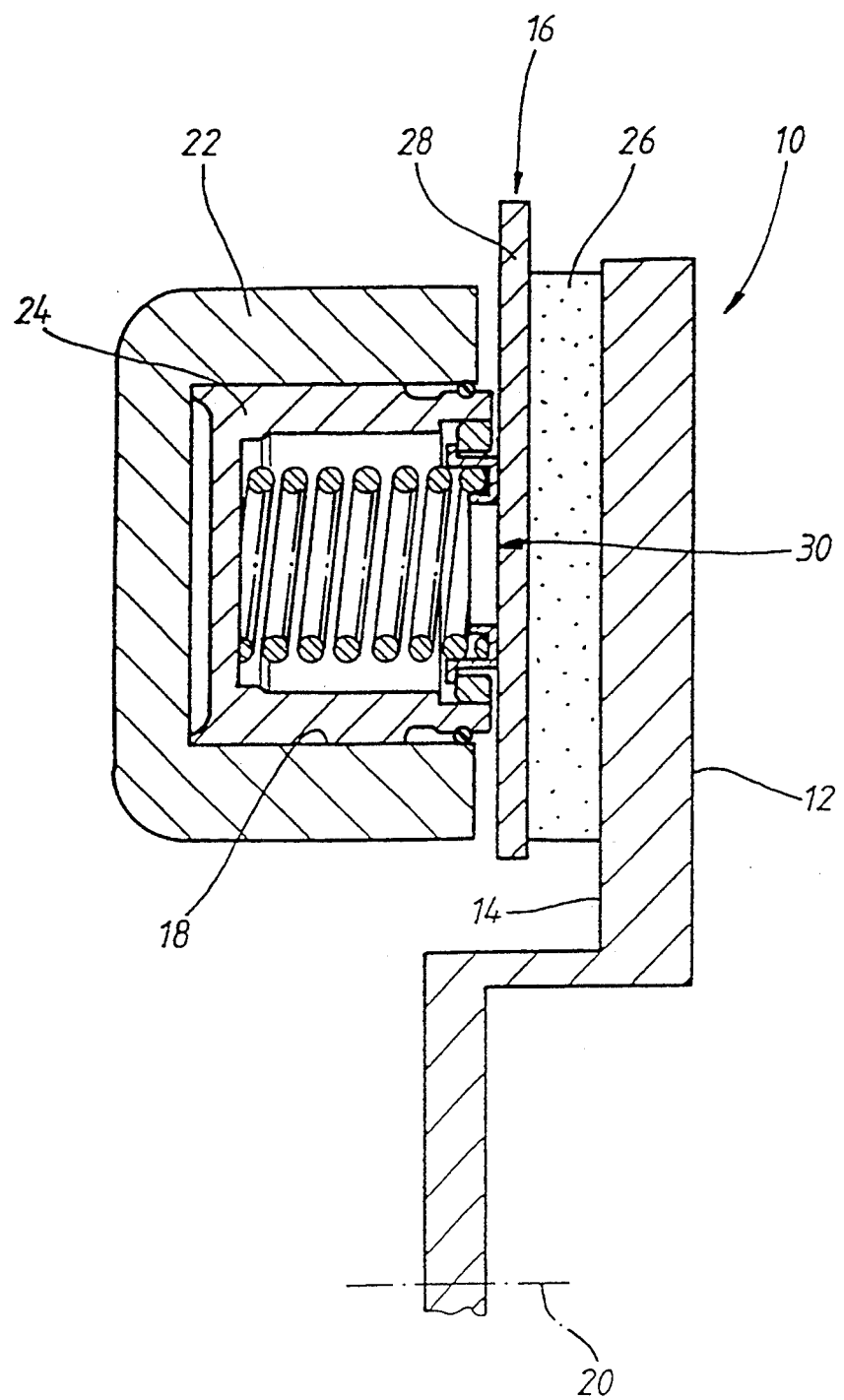
FIG. 1 is a partial longitudinal sectional view through a disc brake according to a first embodiment of the present invention having as a pressure member a hydraulically actuated brake piston, into which a pressing element is integrated.

The part of the disc brake shown in FIG. 1 comprises a brake disc 10 with two brake surfaces 12, 14 formed at its end faces and assigned to respective brake shoes designated generally by numeral 16, of which only that which can be pressed against the brake disc 10 by a controllable pressure member 30 is shown. The pressure member 30 forms, in a generally known way, for example a brake piston 24 which is guided in a cylindrical bore 18 of a brake caliper 22 guided displaceably parallel to the brake-disc axis 20 on a brake anchor plate (not shown for the sake of simplicity).

Figure 2:
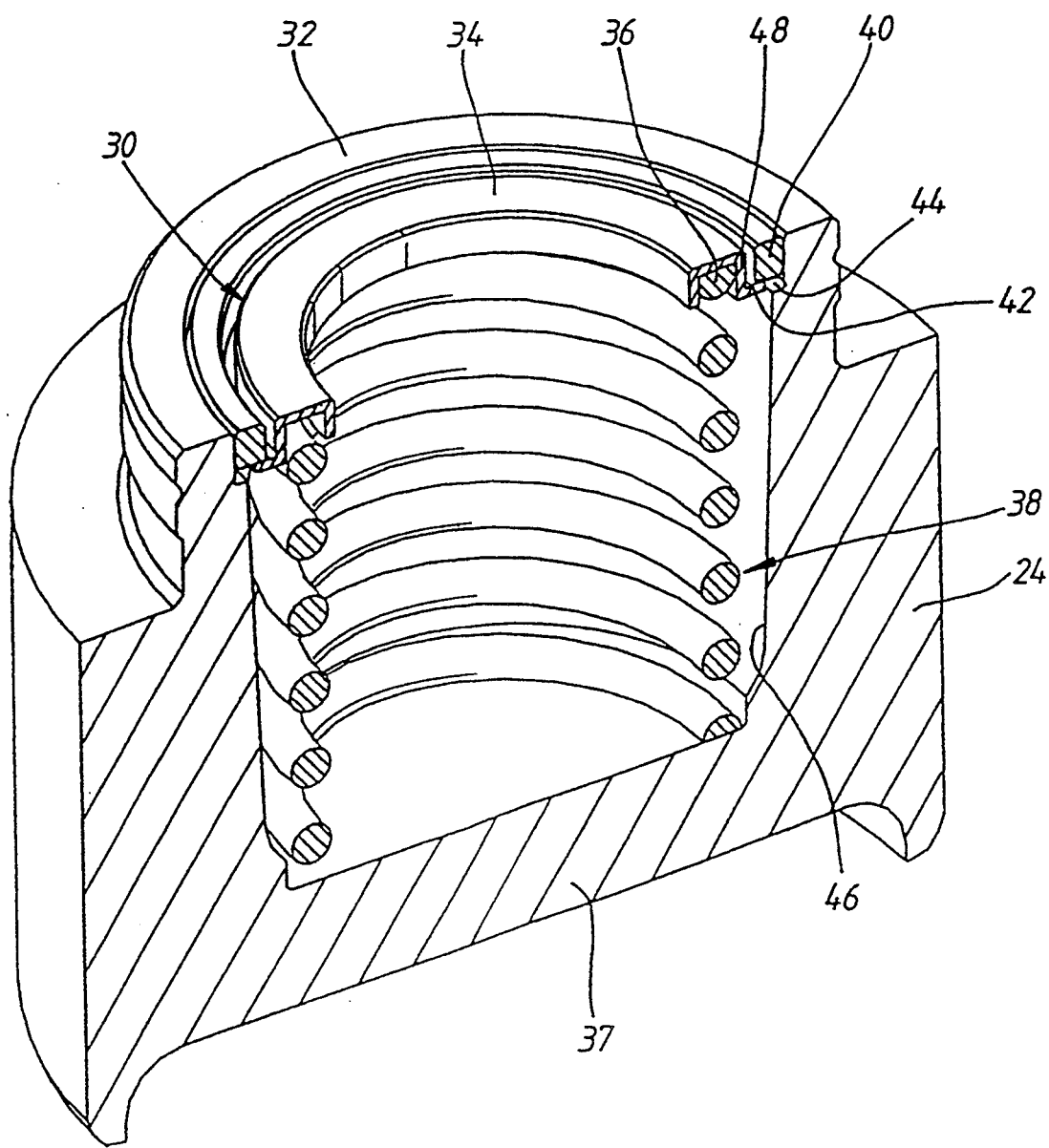
FIG. 2 is a longitudinal sectional perspective view through the brake piston according to FIG. 1.

Two brake shoes 16 are held in the brake caliper 22 by way of a carrier plate 28 carrying a brake lining 26 so as to be displaceable both in the direction of the disc axis and in the direction of rotation of the disc. The carrier plates 28 of the brake shoes 16 are respectively arranged, also in a known manner, with lateral play between stop faces of the brake anchor plate, as is shown, for example, in DE 3,540,810 C1, FIGS. 1 and 2. The brake piston 24 is made in a pot-like configuration and is open on its end face adjacent the carrier plate 28. The pressing element 30 is inserted into this piston end face so as to be axially displaceable and, in its initial position, projects slightly beyond the piston end face 32 (FIG. 2).

The pressing element 30 preferably forms a pressing ring having an outer, flat end face 34 which is supported on the outer end turn 36 of a helical spring 38 inserted into the brake piston 24. The helical spring serves constantly to preserve the projecting length of the pressing ring 30 on the outer brake-piston end face 32. This projecting length of the ring is preferably adjustable and should be between 0.01 mm and 0.1 mm. A preferred projecting length is between 0.01 mm and 0.02 mm.

To fix the projecting length of the ring 30, there is, for example, a stop element, preferably in the form of a stop ring 40, which is inserted into the open piston end face and which does not project beyond the outer piston end face 32. The stop element 40 has an assigned supporting element, preferably in the form of a supporting flange 42, which is formed on the pressing ring 30 and which is supported on the inner ring end face 44. The supporting flange 42 is formed on the outer U-leg 48 of the profile. To calculate the projecting length of the ring 30, the step ring 40 is pressed into the piston recess 46 by a specific amount. Alternatively, the stop ring 40 can also be arranged, in a suitably known way, to be axially adjustable and fixable in the brake piston 24.

Figure 3:
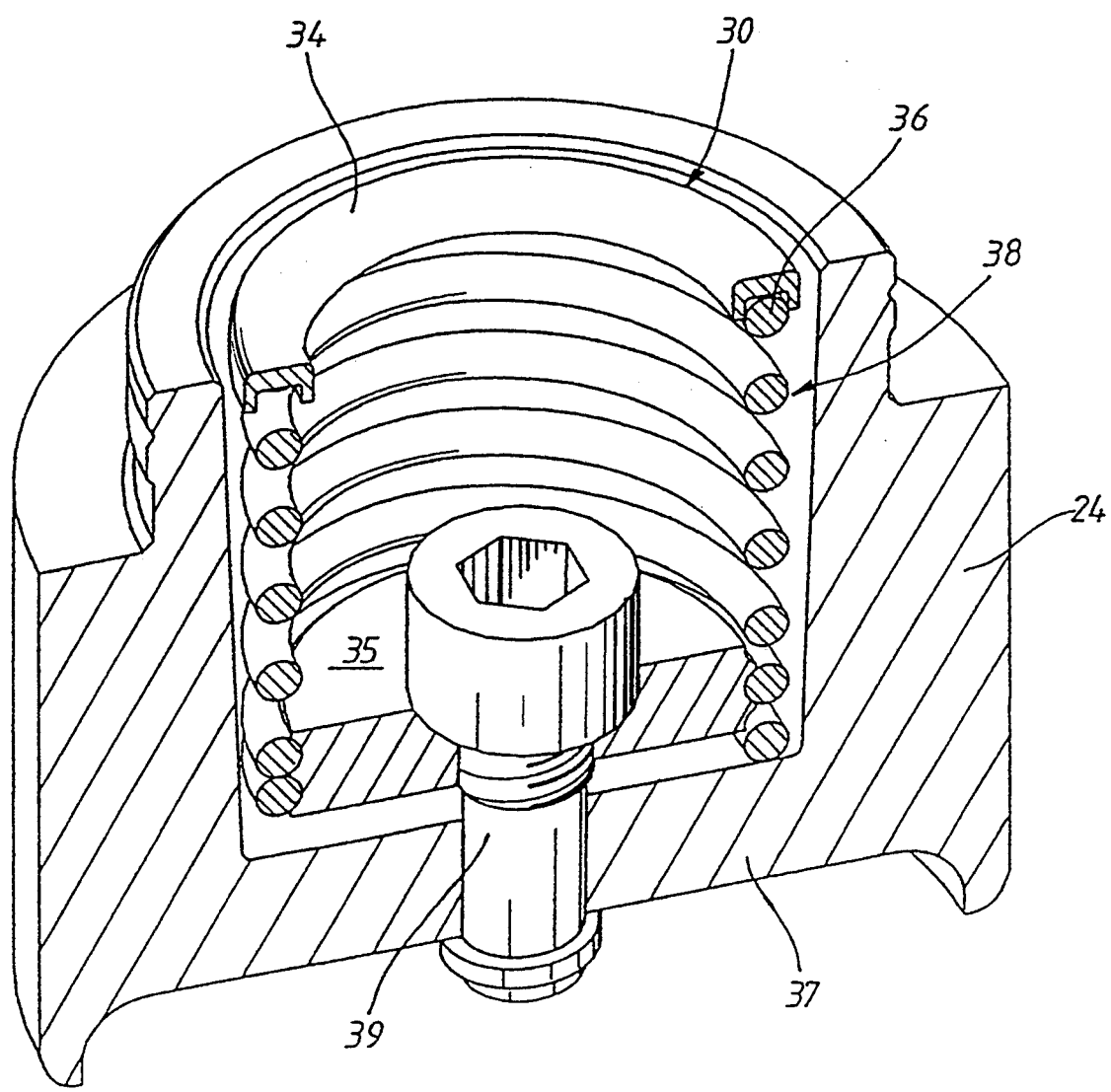
FIG. 3 is a view similar to FIG. 2 but showing a second embodiment of a piston construction.

A further advantageous embodiment utilizing the present invention is shown in FIG. 3. To set the projecting length of the ring 30, in this embodiment the helical spring 38 is arranged in the brake piston 24 so as to be axially adjustable and fixable. For this purpose, the helical spring 38 is seated firmly on a setting plate 35 which is arranged on the thread of a setscrew 39 rotatable in the piston bottom 37. In order to achieve a self-centering connection of the pressing ring 30 and helical spring 38 in a simple way, the pressing ring 30 has a U-shaped cross-sectional profile into which the end turn 36 of the helical spring 38 engages.

When the disc brake is actuated, the outer end face 34 of the pressing ring 30 is laid against the carrier plate 28 of the brake shoe 16 in the course of the movement of the brake piston 24. From this moment of mutual contact between the pressing ring 30 and carrier plate 28, first an appropriately low pressing force, transmitted only via the helical spring 38 to the pressing ring 30, is transmitted to the brake shoe 16, and as a result of the engagement between the brake disc 10 and brake lining 26 occurring thereby, the brake shoe 16 is taken along by the brake disc 10 and can quickly float up to the corresponding stop faces of the brake anchor plate. Thus, before the brake piston 24 comes into contact with the brake shoe 16, the vibration behavior of the brake lining 26, including its carrier plate 28, is varied in such a way that the braking noises are at least largely prevented.

As a result of the small projecting length of the ring beyond the brake-piston end face 32, the brake pressure can build immediately after the brake shoe 16 has been laid against the bearing faces of the brake anchor plate.

Figure 4:
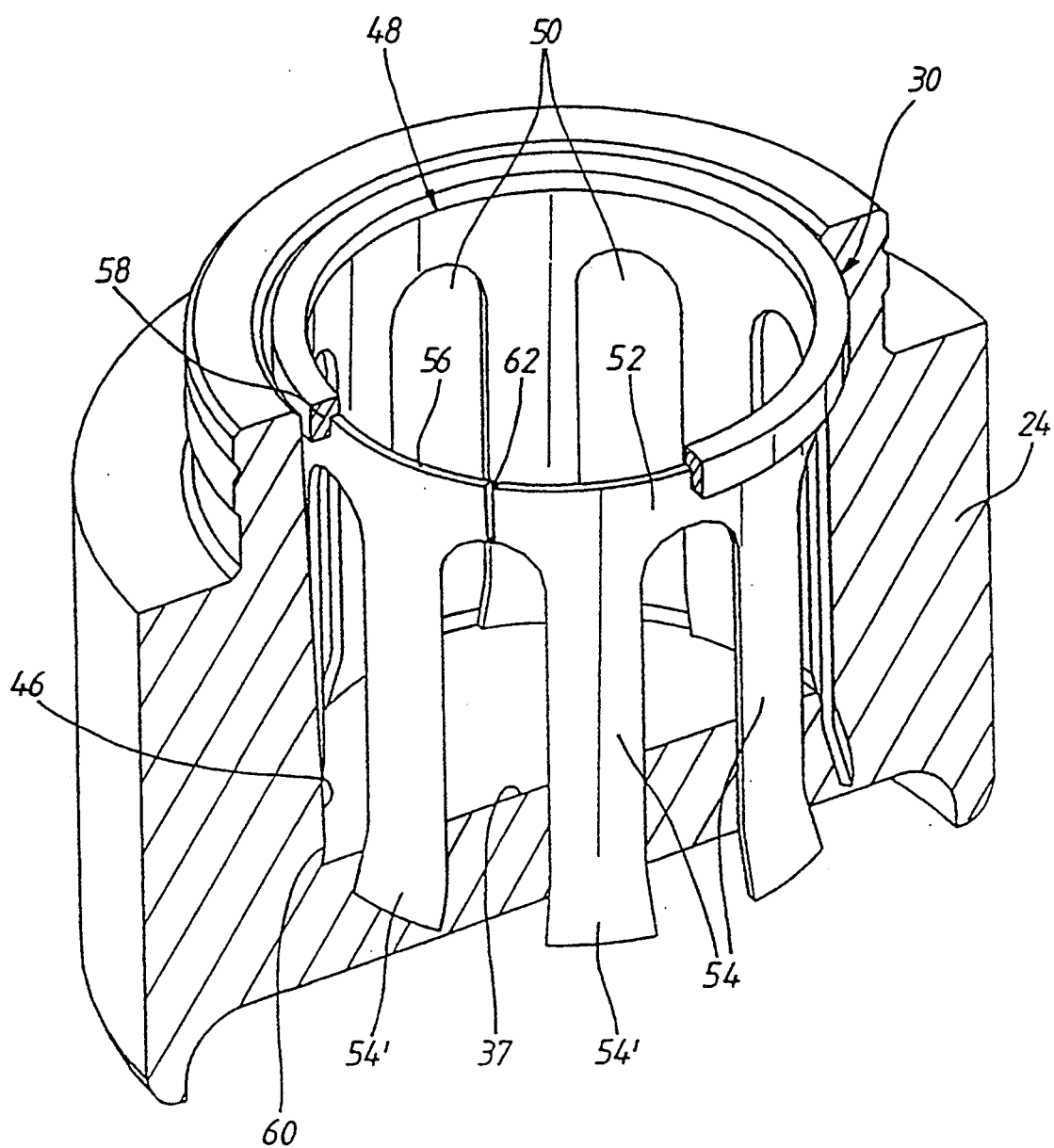
FIG. 4 is a longitudinal sectional view through a brake piston showing a second embodiment of a pressing element according to the present invention.

In the embodiment of FIG. 4 spring sleeve 48 serves as a spring element for the axial resilient support of the annular pressing element 30 and is correspondingly resilient both radially and axially. Slot-like recesses 50 are arranged at an angular distance from one another and extend along generatrices, and are open-edged on the sleeve end face turned away from the brake shoe.

The pressing element 30 forms a shoulder ring 58 which engages over the spring sleeve 48 on the outside and which rests on the end face 56 of the sleeve. The shoulder ring 58 is freely movable, that is to say it can float radially relative to the brake piston 24 and penetrate into the latter. This free movability is ensured, on one hand, by a special bottom undercut 60 of the piston recess 46 into which the outwardly set leg ends 54' engage and, on the other hand, by the sleeve body 52 being slotted at a position 62 in the axial direction and correspondingly widened radially.

The above-described embodiments afford an arrangement characterized by few components and simple assemblies. In addition, they have the advantage that, after a braking operation and in the event of changes in direction of rotation, the pressing element resumes its mid-position in the brake piston 24 automatically, that is to say is centric relative to the brake piston 24, as a result of the return of the helical spring 38 or of the spring sleeve 48.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A disc brake comprising a pressure member guided, in the direction of a brake shoe, in a brake caliper, and a pressing element operatively arranged with radial play in the pressure member such that, in an initial position of the pressure member, the pressing element projects from a front end of the pressure member facing the brake shoe, is supported on the brake shoe and can be pressed back into the pressure member counter to the effect of a return force which results from mutual contact between the pressing element and brake shoe and is lower than a pressing force of the pressure member, wherein the pressing element is a ring supported on a metal spring inserted into the pressure member, the metal spring is a spring sleeve elastically resilient both radially and axially, the ring is a shoulder ring seated on an outer spring-sleeve end face, and the spring sleeve has slot-like recesses arranged at an angular distance from one another and extend along generatrices, and which are open-edged on the outer spring-sleeve end face turned away from the pressure member.

2. The disc brake according to claim 1, wherein the spring sleeve has slot-like recesses arranged at an angular distance from one another and extend along generatrices and being open-edged on the sleeve end face turned away from the pressure member.

3. The disk brake according to claim 2, wherein sleeve legs are present between the slot-like recesses and have outwardly set endpieces arranged to engage behind an undercut wall part of a recess of the pressure member.

4. The disc brake according to claim 3, wherein the sleeve legs present between the slot-like recesses have an outwardly set endpiece, and the leg endpieces engage behind an undercut wall part of a recess of the pressure member.

5. The disc brake according to claim 1, wherein sleeve legs are present between the slot-like recesses and have outwardly set endpieces arranged to engage behind an undercut wall part of a recess of the pressure member.

6. A disc brake comprising a pressure member guided, in the direction of a brake shoe, in a brake caliper, and a pressing element operatively arranged with radial play in the pressure member such that, in an initial position of the pressure member, the pressing element projects from a front end of the pressure member facing the brake shoe, is supported on the brake shoe and can be pressed back into the pressure member counter to the effect of a return force which results from mutual contact between the pressing element and brake shoe and is lower than a pressing force of the pressure member, wherein the pressing element is a ring supported on a metal spring inserted into the pressure member, the ring has an outer annular shoulder engaging behind an inner annular shoulder of the pressure member and the inner annular shoulder of the pressure member is formed by a stop ring pressed into an end face thereof.

* * * * *